United States Patent [19]

Ovshinsky

[11] 4,410,265

[45] Oct. 18, 1983

[54] CASSETTE AND DRIVE SYSTEM FOR MICROFICHE RECORDING SYSTEM WITH TRAVELING FILM HEAD

[75] Inventor: Herbert C. Ovshinsky, Oak Park, Mich.

[73] Assignee: Energy Conversion Devices, Inc., Troy, Mich.

[21] Appl. No.: 289,232

[22] Filed: Aug. 3, 1981

[51] Int. Cl.³ .................... G03B 27/48; G03B 27/50; G03B 27/70
[52] U.S. Cl. ..................... 355/51; 354/174; 354/213; 354/275; 355/72
[58] Field of Search .............. 354/213, 275, 174; 355/50, 53, 54, 51, 75, 72

[56] References Cited

U.S. PATENT DOCUMENTS

4,042,300 8/1977 Spence-Bate .............. 354/174 X
4,173,401 11/1979 Harvey .................... 354/275 X

Primary Examiner—Richard A. Wintercorn
Attorney, Agent, or Firm—Lawrence G. Norris

[57] ABSTRACT

An intermediate film strip cassette and associated drive apparatus provide a film dispensing system for positioning of intermediate images carried on the filmstrip as it is moved from an exposure station to a final station for image transfer to an archival microfiche film under conditions where bowing stresses are applied to the intermediate film at one or more of the processing stations. The cassette performs both supply and takeup functions, and requires no threading by the operator during film replacement. A combination of external locking drive motors engaging the cassette elements and a compliantly loaded takeup idler within the cassette provides a compliant tension to the film element extended into an imaging area, and suppresses erratic film shifts at the various stations while allowing adequate protection against film breakage arising from said bowing. A sensor associated with the tensioning idler aborts the replication process in case of film breakage, and thus guards against loss of archival records from such causes. In one version a system of film markings and external sensors serves to govern film advance and detect and warn of any incipient end-of-film condition. In an alternative version an encoder wheel sensing system driven by film passage over a transport roller serves to govern film advance.

22 Claims, 13 Drawing Figures

CASSETTE AND DRIVE SYSTEM FOR MICROFICHE RECORDING SYSTEM WITH TRAVELING FILM HEAD

BACKGROUND OF THE INVENTION

The present invention has its most important application in annotatable archival recording systems employing an intermediate filmstrip carried by a movable film head having supply and takeup reels for the filmstrip and which is moved between an imaging station and an image transfer station under conditions where bowing stresses are applied to the selected areas of filmstrip to be imaged at one or more of these stations.

There has been developed by the applicant and co-workers an archival hard copy microfiche recording system which reflects light off of a document placed on a document-receiving platform and projects an image of it in greatly reduced form onto an initially transparent intermediate dry silver filmstrip carried by a film head unit. The filmstrip is dispensed from a cassette mounted on the film head, and is fed by film advancing means to an imaging region where a selected area of the filmstrip to be exposed can receive the projected light image. A pressure element presses the selected area of the filmstrip against a planar backing aperture defining a projection plane and an imaging area, and the film is then exposed to the light image. The film head is next moved along guides from the imaging station to a developing station, where a hot shoe pressing against the exposed area of the film causes development of the image to form an opaque image in the exposed areas thereof. The film head is then moved to an image transfer station, where the image on the dry silver film is to be replicated on a positive initially opaque microfiche film card of the photo-developing type (See U.S. Pat. No. 4,137,078 issued June 30, 1979 to Izu and Ovshinsky). The microfiche card is held indexed on a movable carriage so that a predesignated frame of the card receives the image on the intermediate film. A pressure element presses the film card and the intermediate filmstrip together between the output prism of a flash lamp housing and a backing plate. Image transfer is accomplished by energizing the flash lamp to direct light through the intermediate film, immediately rendering transparent the previously opaque areas struck by the high intensity flash lamp light on the selected frame of the microfiche film card. To replicate a new image the film head is returned to the imaging station, where the cycle is repeated.

The bowing stresses applied to the intermediate film during the foregoing processes may cause erratic shifting of the film, resulting in a lack of proper image positioning on the microfiche film card and in some cases image destruction. The intermediate film is typically subjected to bowing stress during both the development and image transfer operations, and is thus vulnerable to such shifting.

The microfiche card may be examined via a "read" mode of the system. With the cassette carriage positioned away from the imaging lens, the microfiche film card carriage, which is accurately locatable in x and y directions by means of an indexing system, is moved on a track to a station under the lens. An illumination system is moved next to the microfiche film card carriage, and then the chosen frame of the card is projected back to the document receiving area. No severe film shifting problems are encountered in carrying out simple "record" and "read" operation. Only a major shift of the intermediate film may cause loss of record.

The system also possesses the capability of "annotating" or "updating" existing records stored on the microfiche film. This arises from the nature of the two film systems used. The intermediate film is of the reversal type; dark areas on the chosen hard copy replicate as transparent areas and light areas replicate as opaque upon development. Hard copy having black lettering on a white page will thus replicate on the intermediate film as an opaque rectangle with transparent letters. The microfiche film, however, is an initially opaque photodeveloping positive film which is rendered irreversibly transparent where struck by high intensity light during flash exposure. Thus, dark markings on the original document replicate as irreversibly transparent images on an otherwise still opaque microfiche film frame. These remaining opaque regions on the microfiche film remain "annotatable", i.e. convertible in that they can be rendered transparent by a subsequent flash exposure. It is this aspect of the microfiche film that allows for updating of microfiche records. As used throughout this disclosure and in the appended claims the term "annotatable" will be understood to refer to a film that is capable of accepting a second image after exposure and development of a first image in the same general region.

Thus, if a copy of a document is imaged on a microfiche film card frame where the indicia on the document are dark lines on a light background, these dark lines are now stored as irreversible clear lines on the microfiche film card. To update the microfiche film card with new entries in a specified still convertible area of a microfiche film card frame one prepares on intermediate film a fresh image consisting of the new entries only. This is accomplished by using as a source for the new image a dark-line record on a white background placed on the document receiving platform, e.g. typewritten black text on white paper. The new image, consisting after development solely of transparent new entries on an otherwise opaque imaging area, is then replicated at the transfer station onto the microfiche film card frame. These new entries are thus replicated as additional irreversible clear indicia on the selected frame. Proper registry of the new record is achieved by using the "read" mode of the system to assist in orienting the new entries on the document receiving platform before the intermediate film is exposed to receive the new image. Here an image of the chosen frame to be updated is projected back onto the document receiving platform, using the "read" mode previously described. A white sheet of paper bearing the new record indicia is then placed on the document receiving platform and moved around until the new indicia are properly positioned with respect to the projected image of the microfiche film card. The frame is now updated by carrying out a conventional "record" cycle, i.e. the microfiche film card is returned to the transfer station, the film head is moved to the imaging station, whereupon the image of the new record indicia is projected, exposed, developed, and replicated onto the microfiche film card frame at the transfer station. Here even a minor erratic image shift from exposure to transfer can become of major importance, e.g. a bookeeping update entry prints onto the wrong line or column. Also, if the bowing stress should shift the transparent unimaged margin of the intermediate film adjacent the imaged area into the projection field at the transfer station this can obliterate the previous record along a narrow band at the side of the microfiche film card frame, which receives the unwanted band of flash lamp light through the transparent portion of the intermediate film undesirably shifted into this field. It thus becomes essential that the intermediate film be prevented from undergoing significant erratic shift during its movement between the imaging and transfer stations.

The prior art which deals with the problem of film shift and register error suppression is disclosed in a co-pending application by P. Klose and H. Ovshinsky (Ser. No. 227,957, filed Jan. 23, 1981). The approach therein comprises clamping the intermediate film in the dispenser near the imaging region, applying compliant tension to it from the takeup system, and controlling the geometry and excursion of the various pressure-applying elements so as to cause a systematic reproducible shift of the intermediate film at the various stations of the system, whereby accurate registry is maintained throughout. Their approach, although successful in suppressing registry error, suffers from the shortcoming that the intermediate film must the hand-threaded over a system of rollers to a takeup reel each time the film supply is replaced. To minimize the necessary amount of operator training, it is an object of this invention that the film dispensing system not require such threading.

It is clear that a break in the intermediate film can cause complete wipe-out of the microfiche image during annotation because then the entire flash lamp projection field strikes the previously imaged frame of the microfiche film card exposed for annotation, and so all areas of the exposed frame are made transparent, obliterating the image thereon. Hence, another object of this invention is to achieve protection from such an occurrence.

The end-of-film condition acts like a "film break" situation and obviously occurs frequently as each roll of intermediate film is used up, and so a special additional sensing system for this condition is desirable. Another object of this invention is to make special provision to sense an imminent end-of-film situation and guard against record loss therefrom.

SUMMARY OF THE INVENTION

In accordance with one of the features of the invention, there is provided in an archival microfiche recording system like that previously described a removable pre-loaded intermediate film cassette which requires no film threading by the operator. The cassette contains dispensing and takeup film reels and a tensioned idler roller for tensioning the intermediate film. Both reels are engagable with locking drive motors which are mounted on the frame and which control film advance and takeup. A sequential locking of the advance motor followed by a limited takeup against the tensioned idler by the takeup motor produces a compliant tensioning of the intermediate film to preserve image registry during the replication cycle.

According to a specific feature of the invention, a photosensor is mounted on the frame to face a suitably located port in the cassette. Passage of a support member for the tensioned idler past the port during the tensioning phase of the film advance operation, actuates the photosensor to cause termination of power to the takeup motor.

According to a specific feature of the invention, the replication process is disabled until such passage is signaled by the photosensor, thereby guarding against record loss arising from film breakage or other cause of tension loss.

According to a specific feature of the invention, the intermediate film is provided with a series of framing marks. An infrared photosensor mounted on the frame, and facing a suitably located port in the cassette interrogates the film during film advance and terminates power to the film advance motor when passage of a framing mark is detected.

According to a specific feature of the invention, the film so marked has an unmarked trailing end. Failure of the marker photosensor to detect marker passage within a preset time after initiation of film advance causes an abort of the replication process and actuates an end-of-film warning means to alert the operator.

Other objects, advantages and features of the invention will become apparent upon making reference to the specifications to follow, the drawings and claims.

DESCRIPTION OF EXEMPLARY FORM OF THE INVENTION

Figure 1:
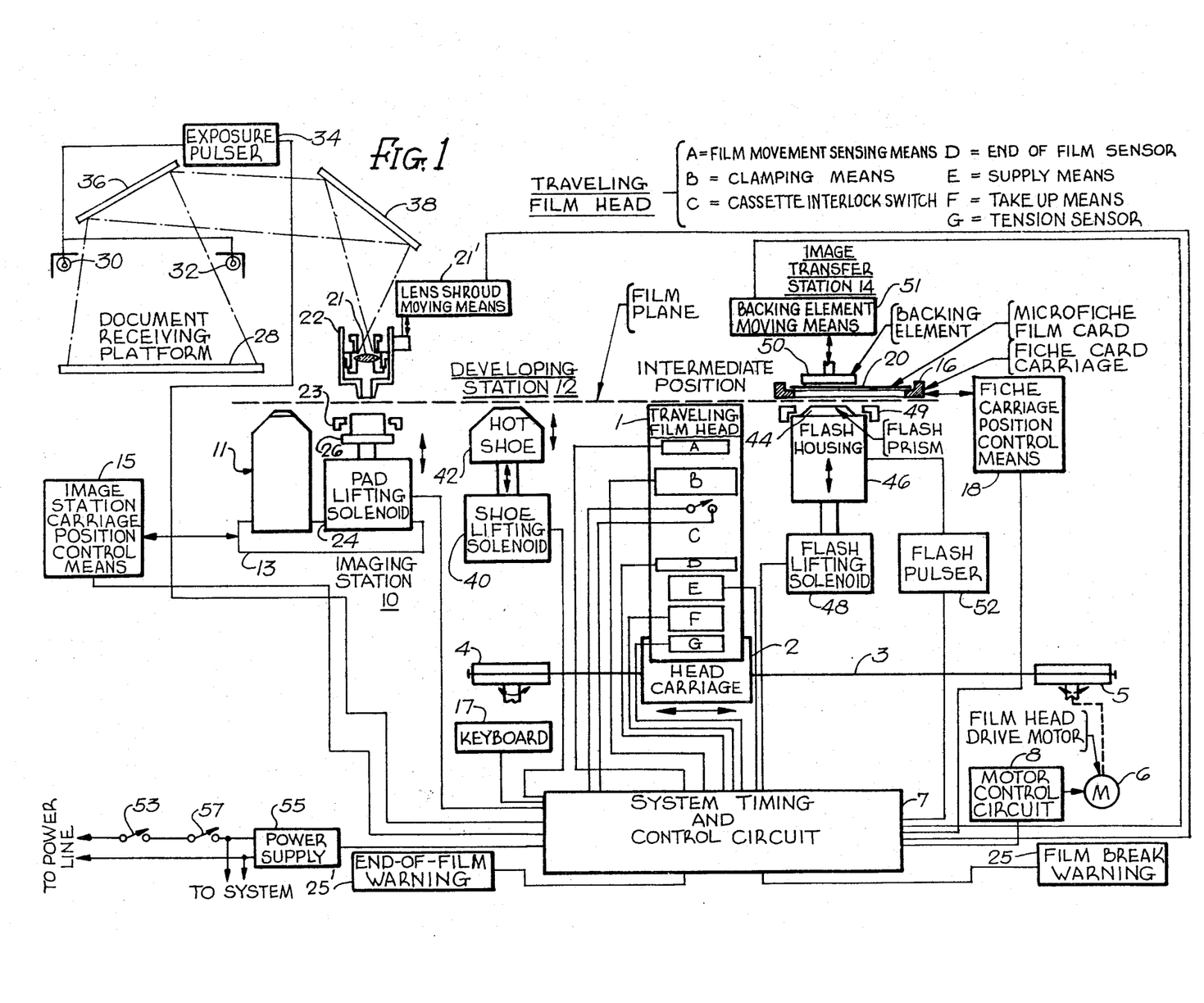
FIG. 1 is a block diagram of the control system of the microfiche recording system of the invention.

FIG. 1 includes a block diagram of the control system for sequencing the operation and movement of an intermediate film head 1 and head carriage 2 between various stations of a microfiche recording system. The head carriage is advanced to the various stations illustrated in FIG. 1 by tension in a belt 3 extending between an idler pulley 4 and a motor driven pulley motor 6 is controllably driven in both directions by a system timing and control circuit 7 operating through a motor control circuit 8. The stations illustrated are an imaging station 10, where the exposed area of the initially transparent intermediate filmstrip on the film head 1 is exposed to a light image, such as light reflected off of a hard copy, a heat-applying developing station 12 where the light-exposed areas of the intermediate film are rendered opaque, and an image transfer station 14. A microfiche film card carriage 16 at the image transfer station 14 positions, under control of a fiche carriage postion control means 18, a selected frame of a microfiche film card 20 for reception of an image last formed on the filmstrip carried by the film head 1. The microfiche film card 20 is preferably made from a photo-developing initially opaque archival film of the dispersal type disclosed in U.S. Pat. No. 4,137,078 issued to Izu and Ovshinsky, wherein a transferred image is formed automatically upon exposure to a high intensity flash of radiant energy, such film being completely insensitive to exposure to normal room ambient light or even direct sunlight. The film carried by the film head is preferably more light reflected and imaged from hard copy. The intermediate film carried by the film head is preferably a dry-silver heat-developed film.

As used herein, the term film head refers to a frame removably attached to a carriage, and a film supply unit removably mountable on the frame. The film head 1 carries a film supply means E, a film takeup means F, and a film clamping of holding means B. In various versions of the system all three are sequentially controlled by the system timing and control circuit 7. For example, the supply means E may include a supply reel or cassette, and various guide rollers as well as film driving means whereby the supply reel is to be driven. The takeup means F may include a takeup reel and guide roller means as well as film tensioning means and takeup reel drive means. In addition, the film head may include an end-of-film sensor D which may respond to a marking on the film. The film head may also include a tension sensor G responsive to tension in the film. The end-of-film sensor D and tension sensor G perform control functions which respond to end-of-film or film breakage and disable operation of the system under these circumstances. In various ways, when film breakage occurs, which would, for example, be detected by the absence of film movement by sensing means A, a film break warning 25 is energized and further operation of the system is shut down to avoid an image transfer operation. Similarly, when the sensor D senses the end of the film, the end of film warning 25' is energized and further operation of the recording system is also prevented. The film head 1 may also include a film head interlock switch C which communicates the status of a light sealed film dispenser cover to the system timing and control circuit 7, so that the system cannot be operated with the cover open and the film inside thus subject to light fogging.

Figure 5A:
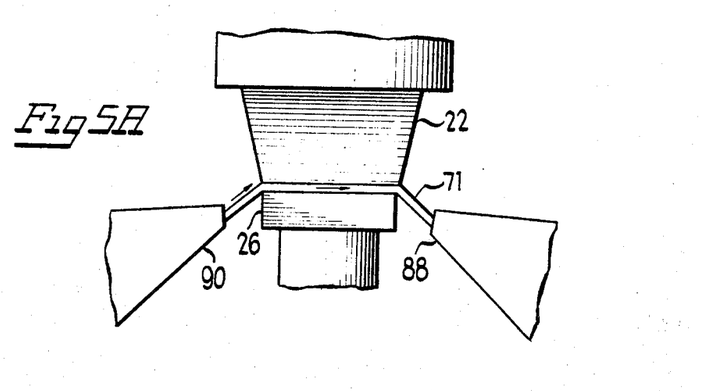
FIGS. 5A-5C are fragmentary sectional enlarged views of the region between the payout and takeup lip regions of the film head illustrating the controlled filmstrip bowing action at the imaging, developing, and transfer stations.

Initially, the film head 1 is moved to the imaging station 10, where an imaging area of the filmstrip is placed under a projection lens 21 contained in a lens shroud 22 (see FIG. 5A). The film clamping means B is actuated to a film release condition and an area of fresh intermediate filmstrip is advanced by driving the supply or takeup means E or F. Payout length is governed by the film movement sensing means A, which effects generation of electrical signals responsive to the length of film payout to the system timing and control circuit 7. After the requisite film advance, the system timing and control circuit 7 stops driving of the film supply or takeup means E or F and actuates the clamping or holding means B back to a film holding condition, whereupon a signal from the system timing and control circuit 7 raises a backing pad 26 up against a pad limit stop 23. A subsequent command from the system timing and control circuit 7 actuates a lens shroud moving means 21' to lower the lens shroud 22 to clamp the intermediate film between the backing pad 26 and the base of the lens shroud 22. A document receiving platform 28 is next illuminated by flash lamps 30 and 32 energized by the exposure pulser 34 on command from the system timing and control circuit 7, the image of the platform and its contents being relayed to the projection lens 21 by two mirrors 36 and 38. On command, the pad lifting solenoid 24 drops the backing pad 26, and the lens shroud moving means 21' lifts the lens shroud 22, thereby releasing the film. The film head 1 is now moved to a developing station 12, where a shoe lifting solenoid 40 controlled by the system timing and control circuit 7 raises a hot shoe 42 (see FIG. 5B) against the imaging area 9 (see FIG. 2) of the filmstrip 71 for a predetermined length of time set by the system timing and control circuit 7, whereupon the shoe lifting solenoid 40 drops the hot shoe. The film head 1 is then moved to a position which places the imaging area 9 of the filmstrip over a flash prism 44 on a flash housing 46. A selected frame of a microfiche film card 20 on a microfiche card carriage 16 is moved into appropriate position over the flash housing 46 with the system timing and control circuit 7 controlling the microfiche carriage position control means 18. The desired frame of the microfiche film card 20 is selected by operation of keys of a keyboard 17 which cause the control circuit 7 to operate the microfiche carriage position means 18. On command of the system timing and control circuit 7, a flash lifting solenoid 48 raises the flash housing 46 against a limit stop 49. A backing element 50 is lowered by the backing element moving means 51 so as to press the imaging area of the intermediate filmstrip into intimate contact with the microfiche film card 20 and a backing element 50 (see FIG. 5C). Image transfer is achieved by actuating the flash tube (not shown) in the flash housing 46 by a command from the system timing and control circuit 7 operating through a flash pulser circuit 52. Immediately after exposure, the lifting solenoid 48 drops the flash housing 46, and the backing element moving means 51 raises the backing element 50, thereby releasing the two films.

The pad lifting solenoid 24 and a projection light source 11 are mounted on an image station carriage 13. A station carriage position control means 15 is commanded by the system timing and control circuit to position either the pad lifting solenoid 24 or the projection light source 11 under the lens 21. For reading or updating a microfiche the fiche card carriage 16 is moved by the fiche carriage position control means 18 to a position under the lens 21, and the projection light source 11 is moved into position below it so as to project the image on the microfiche back onto the document receiving platform 28 for inspection and, where an add-on of information is to be made on the frame of the microfiche card involved, an overlay of the added information can be properly positioned over the projected image. The recording system carries out the desired "read", "record" and microfiche frame positioning operations as commanded by the operator by depressing the appropriate keys on keyboard 17 connected to the system timing and control circuit 7. The system timing and control circuit is powered by a power supply 55 connected to the power line by a main power switch 53 and a system interlock switch 57 actuated to an open position by opening a system access door (not shown). Because of the unique capability of a minicomputer to execute a complex series of commands, responses, and alternative operations, all sequencing and sensing operations are carried out by a program stored in a minicomputer memory, the minicomputer constituting a portion of the system command and control circuit 7.

Figure 2:
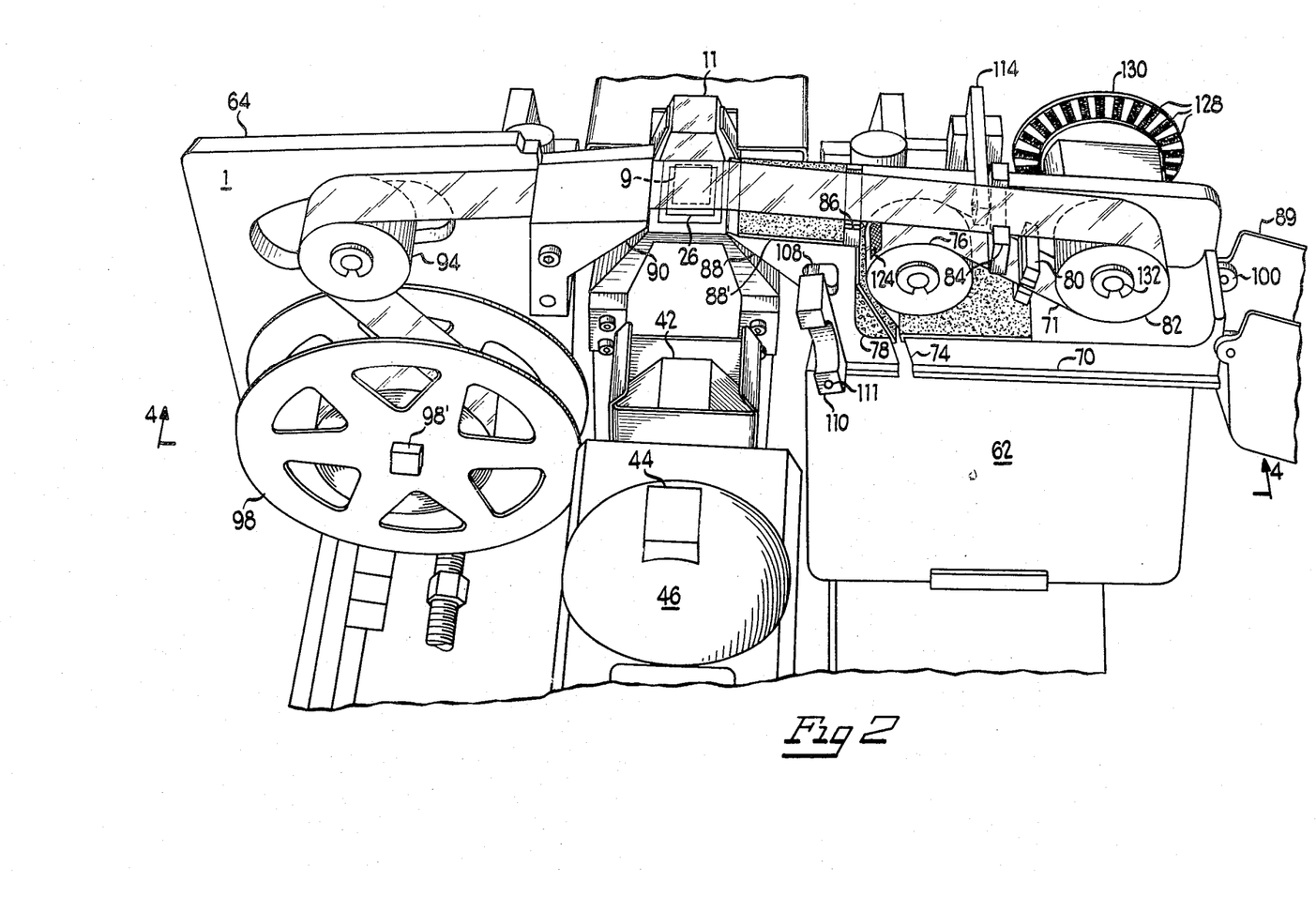
FIG. 2 is a perspective view of one form of the intermediate film head positioned at the imaging station with the film head cover in the open position.
Figure 3:
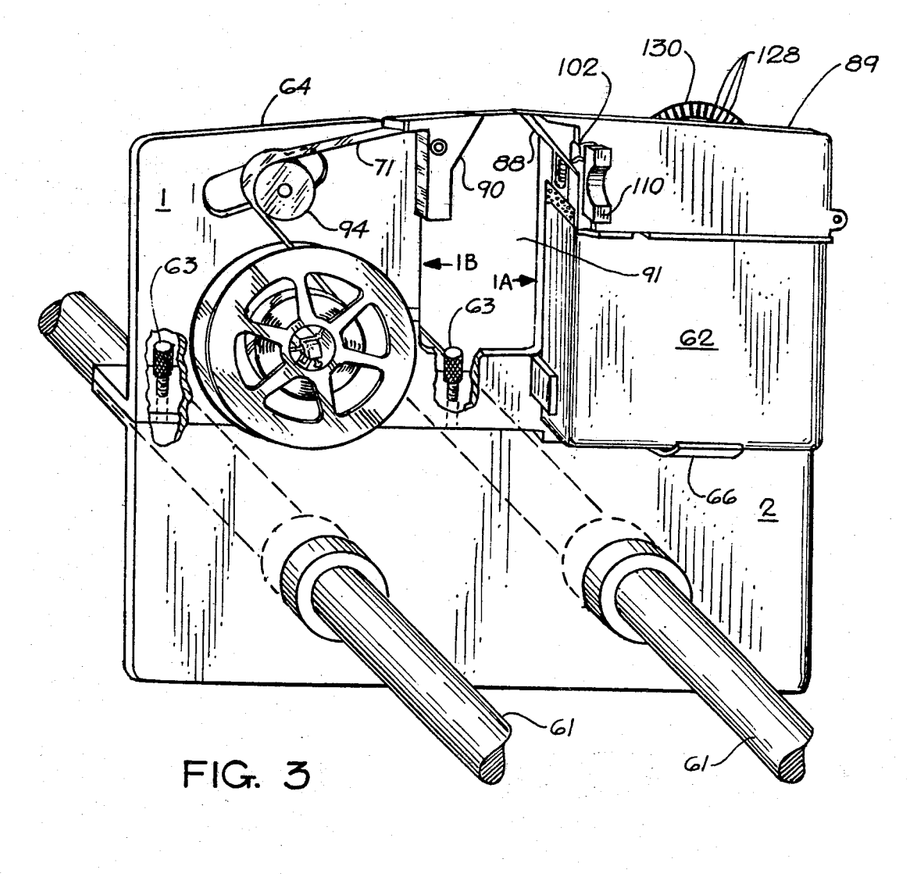
FIG. 3 is a perspective view of the traveling intermediate head mounted on a carriage supported on guides.
Figure 4:
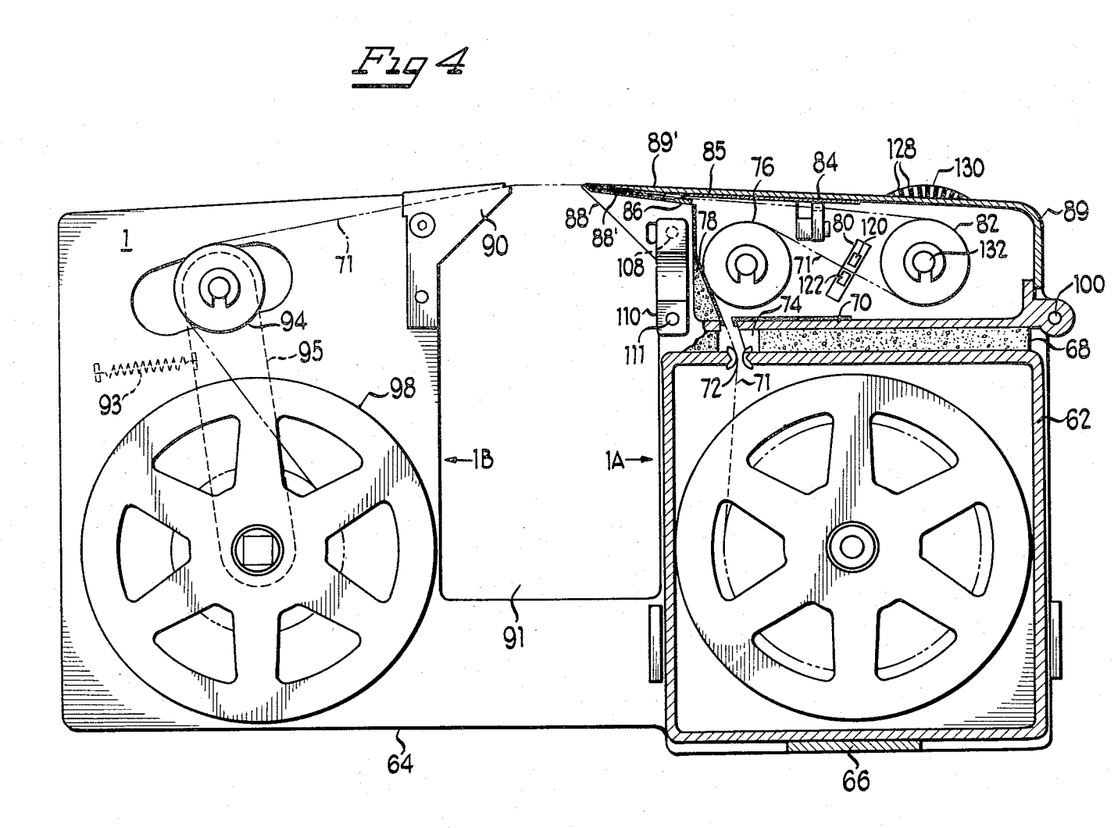
FIG. 4 is a partially sectioned elevational view of the intermediate film head with portions of the cassette housing and film head cover portion thereof cut away.

Refer now to FIGS. 2,3 and 4, which show the details of an earlier version of the film head 1 as disclosed in the previously mentioned co-pending application of P. Klose and H. Ovshinsky. FIG. 3 shows the traveling film head 1 removably mounted as by screws 63 on the carriage 2 guided for horizontal movement on guide rods 61. FIG. 2 shows the film head positioned at the imaging station 10. The backing pad 26, the hot shoe 42, the flash prism 44, and the projection light source 11 are also shown. The film head is shown as including a film supply section 1A including a removable film dispensing cassette 62 mounted on a film head frame 64 and held in position between a cassette support ledge 66 and a compliant light-tight strip 68 (FIG. 4) affixed to the bottom of a top ledge 70 on the frame 64. The intermediate filmstrip 71 exits the cassette through a light-tight slot 72 and then passes through a corresponding slot 74 in the compliant light-tight sheet 68 and the top ledge 70, next around an idler roller 76 where it presses against a compliant friction pad 78 which places a drag force on the film, and thence through an end-of-film sensor unit 80. The filmstrip 71 then passes around an encoder roller 82 and back over a film clamp lifter 84, then over a clamping block 86 where it then exits the film supply section between a payout lip 88 and a pad 88' on a film head cover 85 where one frame width of the filmstrip is exposed for external processing at what may be called an imaging area of the film head. The frame 64 has a large region 91 between the film supply section 1A and the film takeup section 1B of the film head. This open region receives the backing pad 26, hot shoe 42 and flash housing 46 at the imaging, developing and image transfer stations 10, 12 and 14. The film then passes over a takeup lip 90 on the takeup side of the imaging area and then proceeds over a dancing roller 94 carried on an arm 95 tensioned by a spring 93 which forces the roller away from the takeup lip 90, and serves to keep the film under tension. The film then winds on a motor driven takeup reel 98 driven by a locking takeup motor (not shown) mounted on the frame 64. The takeup reel 98 is mounted on a drive shaft 98' which makes connection to the motor in any suitable way, such as by a pulley belt coupling. The entire film head 1 can be removed from the carriage 2 by removing the screws 63—63 and raising the film head therefrom, where the film can be threaded through the film head conveniently away from the carriage.

In this embodiment the film holding or clamping function is achieved by a short clamp blade (85) mounted inside the cover 89. When the cover 89 is closed, the blade presses down on the film strip 71 to pin it to the clamping block 86. The cover 89 is tensioned down by a loading spring (not shown). Clamping release is achieved by a solenoid (not shown) drawing down the exterior end of a pivoted lift bar 114, thus raising the interior end of the lift bar carrying the film clamp lifter 84 so as to force the lifter into contact with the interior face of the cover 89 against the force of the loading spring. This raises the cover 89 sufficiently to raise the clamp blade out of its film engaging position, thereby releasing the filmstrip 71.

The rotation of the encoder roller 82 during film advance is detected by a photosensor (not shown) which monitors the passage of opaque interruptor lines 128 on a transparent encoder wheel 130 attached to the outboard end of the encoder roller shaft 132, the wheel, shaft, and roller being rigidly interconnected. The resulting pulses from the photosensor are transmitted to the system timing and control circuit to govern film advance.

Figure 5B:
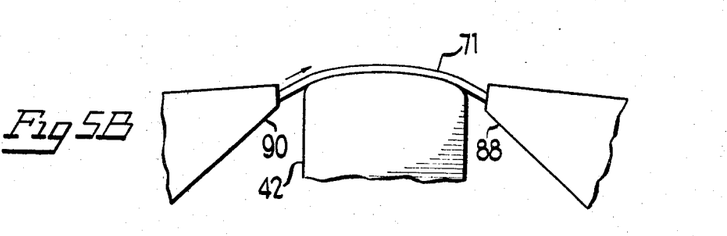
Figure 5C:
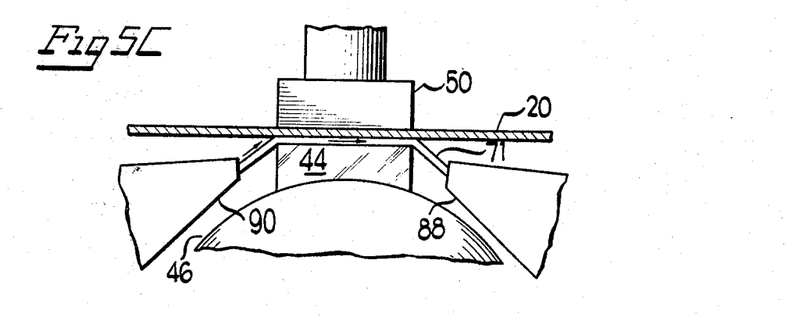

FIGS. 5A through 5C show plan views of the film head 1 in the region of the imaging area of the film head during image exposure (FIG. 5A), development (FIG. 5B), and image transfer (FIG. 5C). Since the intermediate film 71 is rigidly clamped internally by the clamping blade 85 (see FIG. 4) on the payout side, the film is fixed in position at the payout lip 88. However, the compliant film tensioning of the film by the spring loaded dancing roller 94 on the takeup side permits film shifting to take place on the takeup side as shown by arrows in FIGS. 5A, 5B, and 5C when the backing pad 26, hot shoe 42 and flash housing 46 are raised into position. This prevents breakage of the intermediate film 71 under the forces involved. By controlling the excursion and geometry of the pressure-applying elements a reproducible systematic shift of the intermediate film at the various stations is achieved, as disclosed by P. Klose and H. Ovshinsky in the co-pending application previously mentioned. By this method registry errors arising from film shift are successfully held to tolerable limits.

The film head as described in the foregoing, although satisfactory in operation, suffers from the disadvantage that the intermediate film must be threaded by the operator. To minimize the necessary amount of operator training, it is desirable that a film dispensing system be employed that does not require such threading. The subject matter of this disclosure is such a system comprising an inexpensive dispensing and takeup means in a single large cassette requiring no threading and designed to be quickly and easily replaced by untrained personnel. The dispensing and takeup means are designed to provide a compliant film tension system similar in function to that previously described. The subject matter of this disclosure is the sole work of H. Ovshinsky.

Figure 6:
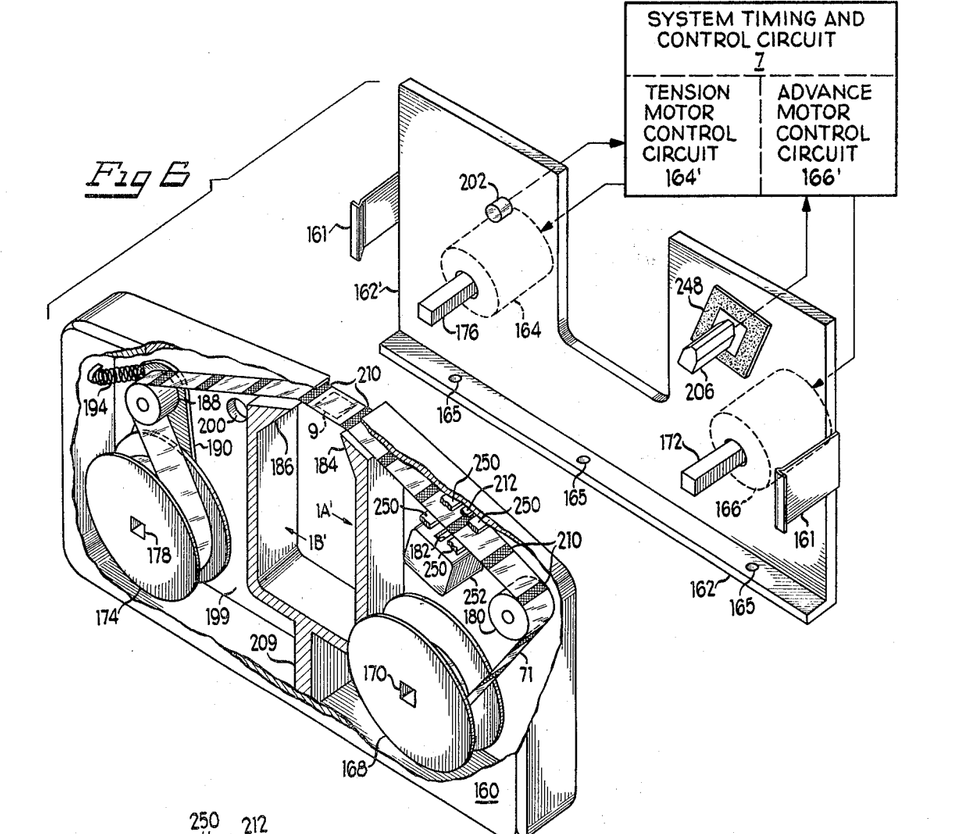
FIG. 6 is a perspective exploded view in partial section of a cassette and a vertical wall of the support frame therefor which forms the exemplary form of the invention where the cassette has pre-loaded reels, the figure also showing lockable motors in dashed lines being carried by the vertical wall of the frame.
Figure 7A:
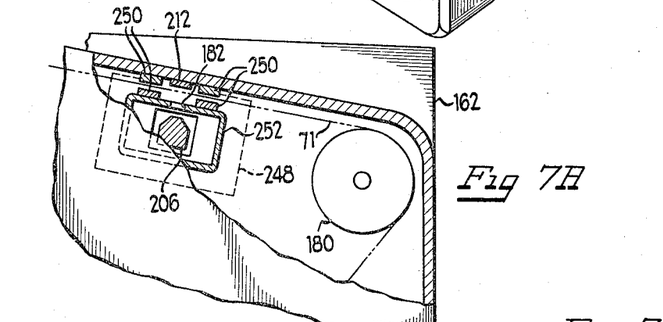
FIG. 7A is a partially sectioned fragmentary view of the upper part of the film supply section of FIG. 6 showing details of the film advance sensor projection inside the sensing aperture shroud when the cassette is mounted to the carriage wall shown in FIG. 6.
Figure 7B:
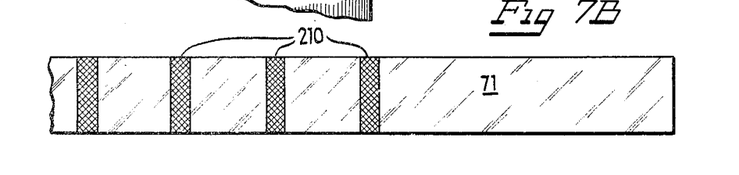
FIG. 7B shows a portion of the intermediate filmstrip provided with framing markings.

FIGS. 6, 7A and 7B show the exemplary form of the invention consisting of a modified frame 162', removably engagable by means of bolts (not shown) through holes 165 with a carriage 64 of the general type shown in FIG. 3, and a large cassette 160 removably mountable on the frame by means of clips 161. The cassette 160 is preloaded with intermediate film 71, preferably of the transparent dry-silver type previously described. The cassette 160 is locked in place, as by clips 161—161 on the frame 162'. The frame 162' carries a lockable film advance motor 166 and a lockable film tensioning motor 164. A lockable motor has a shaft which when the motor is de-energized is locked in position. A supply of intermediate film 71 is carried on a supply reel 168 inside the cassette 160, the supply reel being configured with a non-circular supply reel drive socket 170 configured to lockingly engage a similarly shaped supply reel drive shaft 172 driven by the film advance motor 166. Similarly, a film takeup reel 174 lockingly engages a takeup reel shaft 176 by means of a takeup reel drive socket 178, the takeup reel shaft 176 being driven by the film tensioning motor 164. The shafts 172 and 176 project from the carriage frame 162'. The intermediate film 71 is paid off from the supply reel 168 where it passes over an idler roller 180, then over and in close proximity to a first sensing aperture 182 (FIG. 7A), then exiting the payout side of the cassette over a payout lip 184 against which the film is pressed by the tension in the film. The film is there exposed at the imaging area of the cassette. The film enters the takeup side of the cassette via a takeup lip 186 and then passes over a takeup idler 188 rotatably mounted at the end of an idler support arm 190, the idler support arm being in turn rotatably mounted to rotate freely about a wall-mounted pivot (not shown). In the exemplary form the pivot is located behind the takeup reel 174. A takeup idler spring 194 urges the idler support arm 190 and takeup idler 188 away from the takeup lip 186, thus tensioning the filmstrip 71. In the normal position of the support arm 190, the support arm is opposite an arm position sensing opening or window 200 in the rear wall 199 of the cassette. The film payout sequence is initiated by the energization of advance motor 166 for a predetermined period, which results in the outer and (left) movement of the arm 190 away from the window 200 under the force of spring 194. The advance motor 166 is controlled by an advance motor control circuit 166', a subunit of the system timing and control circuit 7. The spring 194 takes up the slack in the film caused by rotation of the advance motor 166, thus causing payout of the film from the supply reel 168. Film advance is terminated by de-energization of the advance motor 166, resulting in a locking action against further payout, whereupon the system timing and control circuit 7 operated the tension motor control circuit 164' to energize the film tensioning motor 164. This drives the takeup reel 174 so as to wind in the intermediate film 71 thereon. The resulting tensioning of the filmstrip 71 causes the takeup idler support arm 190 to move toward the sensing opening or window 200.

Mounted opposite the sensing opening or window 200 on the carriage frame 162' is a reflection photosensor 202 which when it detects the presence of the idler support arm 190 communicates a halt signal to the timing motor control circuit 164' thereby de-energizing the tensioning motor 164, leaving the film 71 under compliant tension supplied by the takeup idler spring 194. The system timing and control circuit 7 also responds to the absence of a signal from the photosensor 202 by inhibiting the flash pulser 52 from firing by elementary gating logic means unless the idler support arm 190 is detected by the photosensor 202, indicating proper film tension. A film break after windup will cause the are 190 to move away from the sensing opening or window.

A film break before or during windup will prevent the idler support arm 190 from reaching the proper position. In either case the flash pulser 52 is inhibited by absence of a tension-indicating signal from the photosensor 202, thereby preventing a flash operation which could result in the loss of a record on the exposed frame of the film card should a film break condition occur, which obviously removes or misplaces the desired frame of the intermediate film from the imaging area or the cassette. A light barrier 209 prevents any light entering the cassette 160 via the sensing opening or window 200 from fogging the unexposed film 71 on the supply side 1A' of the cassette.

The length of time the advance motor 166 is energized is determined by the signal generated by an infrared reflection photosensor 206 interrogating the filmstrip 71 as it passes the sensing aperture 182. The photosensor 206 projects from frame 162' into the cassette 160 through an opening in a light tight shroud 252 on the cassette which shroud has the aperture 182. The film strip 71 (FIG. 7B) has opaque markers or lines 210 spaced one frame length apart. The output signal from the photosensor 206 is passed to the advance motor control circuit 166', and an advance motor energizing cycle is terminated upon detection of the passage of the next opaque framing line 210 (FIG. 7B) on the intermediate film strip 17 by the photosensor 206. FIG. 7A shows details of the reflection photosensor 206 and the first sensing aperture 182 when the cassette 160 is mounted on the frame 162. The photosensor 206 is of the conventional line-sensing type, consisting of a light source and a photodetector (not shown) designed to emit a spot of light and respond to a reflection thereof from a reflecting element 212 mounted on the inside of the upper wall of the cassette 160.

The opaque framing lines 210 moving past the photosensor 206 intercept the emitted light resulting in the generation of the requisite timing signal. The photosensor 206 is so positioned that the framing lines 210 are properly positioned on either side of the imaging area 9 when a frame line 210 passes the photosensor. These lines can thus act as light absorbers inhibiting fogging of the unexposed portions of the intermediate filmstrip by light piping caused by the high intensity flash light at the image transfer station. As previously indicated, interruption of the reflected light by a line 210 causes the advance motor control circuit 166' to de-energize advance motor 166 to terminate film advance.

An incipient end-of-film condition is signaled by the absence of framing lines near the end of the film 71 as shown in FIG. 7B. Failure of the photosensor 206 to detect a framing line within a present time after initiation of film advance causes the system timing and control circuit 7 to actuate the end-of-film warning means 25' and abort the replication sequence. This is most advantageously accomplished by causing the control program of the system timing and control circuit to enter a timing loop of preset duration during actuation of the advance motor 166. Upon receipt by the system timing and control circuit 7 of a signal from the photosensor 206 indicating passage of a framing line 210, the program flow branches to continue the replication sequence via the remainder of the stored program. If the timing loop cycle is completed without receipt of such a signal, the program flow proceeds directly to execute a stored abort routine. Other methods equally well known to the art could be used for executing such an abort, such as using an external electrical timer and appropriate enabling and disabling gates responsive to timer and photosensor signals. Possible alternative methods for sensing film advance and end-of-film would include mechanical sensing of notches, holes or similar mechanical discontinuities in or on the film by conventional mechanical sensing means.

Figure 8:
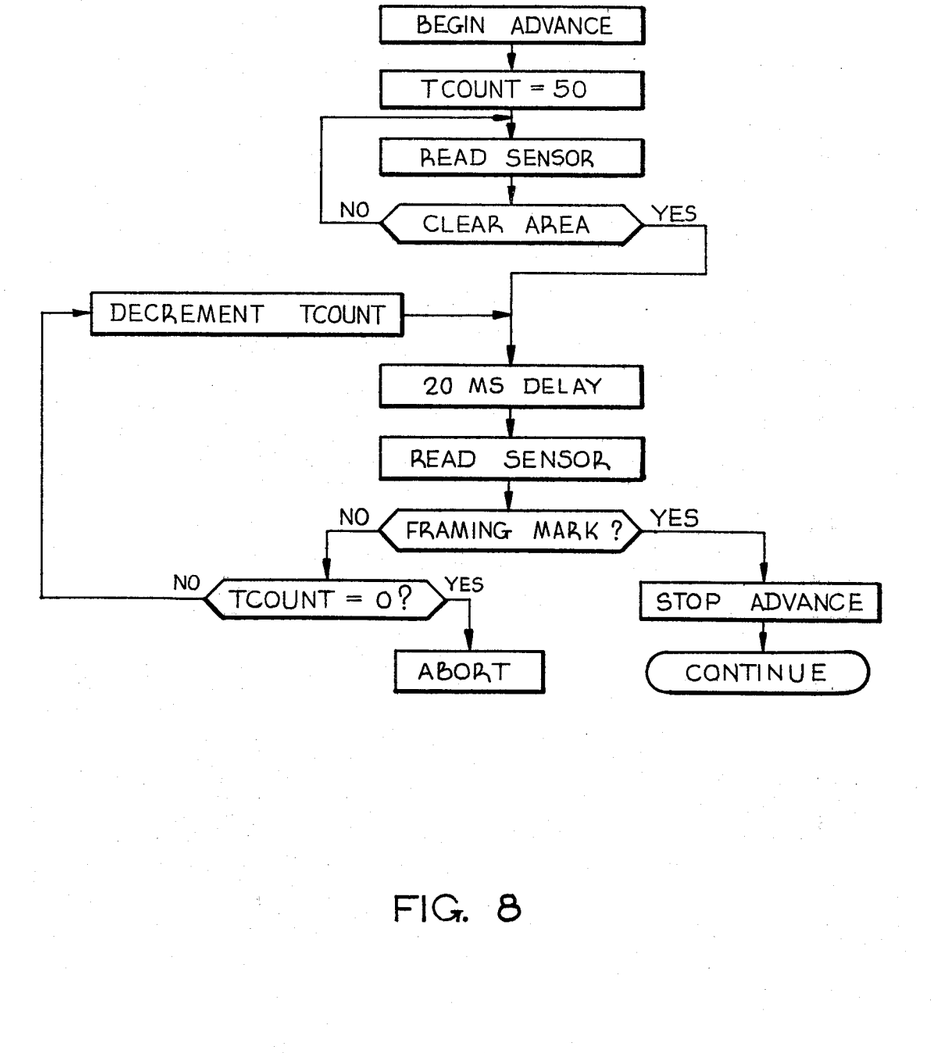
FIG. 8 is a flow diagram showing program control during intermediate film advance.

FIG. 8 shows an illustrative flow chart for using a timing loop program to govern film advance. The step BEGIN ADVANCE actuates the advance motor control circuit 166' (FIG. 6). The program shown is designed to interrogate the photosensor 206 every 20 milliseconds to detect passage of a framing line. The preset time interval to govern the abort sequence initiation will be taken for illustrative purposes as nominally one second. Accordingly, a stored variable TCOUNT, which sets the maximum number of interrogations before aborting, is assigned the value of 50. Next the photosensor is interrogated to determine whether or not the framing line which was positioned in front of the photosensor before initiation of film advance has advanced to yield a clear area. If not, the program returns to interrogate the sensor and repeat the cycle until a clear area is presented, at which time the program flow branches to enter a 20 millisecond delay loop. After 20 milliseconds, the sensor is again read, and a program branching occurs based upon the sensor reading. On the initial tours of the program, no framing mark is detected, and program flow branches to test the current value of TCOUNT. On the first tour this value is 50, and the program returns, decrementing TCOUNT by one and re-entering the circuit. A series of passes around the circuit then occur, decrementing TCOUNT each time until either a framing mark is detected or TCOUNT is decremented to zero. Since all operations except the 20 millisecond delay are comparatively instantaneous, it will require approximately 1000 milliseconds to decrement TCOUNT to zero. Should TCOUNT reach this value before a framing mark is encountered, program flow will branch from the TCOUNT test to enter and execute the routine labeled ABORT. Should a framing mark be encountered before this occurs, program flow branches from the framing mark test to terminate power to the film advance motor and then to continue the remainder of the replication cycle.

The sensors for film advance and end-of-film may also be placed between the payout lip 88 and the takeup lip 90, or on the takeup side of the cassette 160. Direct film advance and end-of-film marker sensing by infrared photoreflection sensors stationed opposite infrared transparent cassette windows which bar entry of visible light is also envisioned.

Figure 9A:
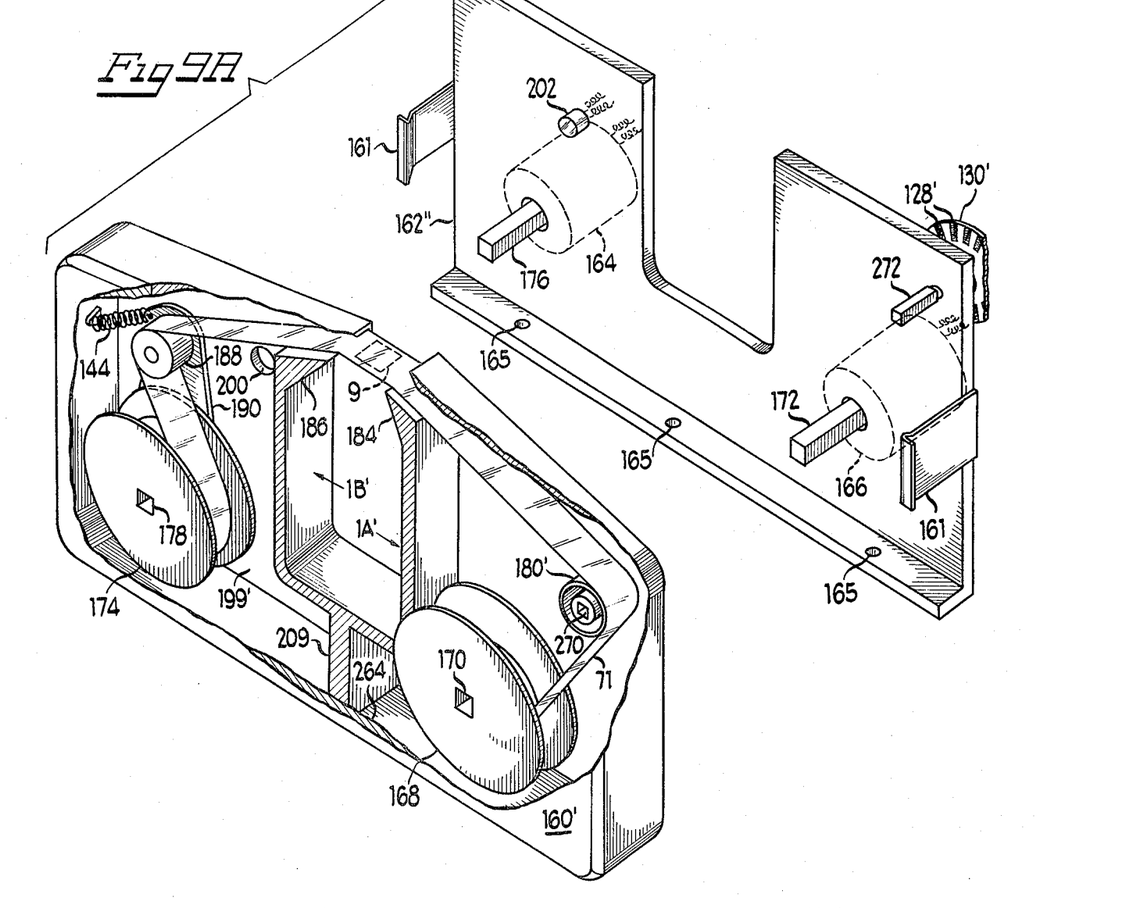
FIG. 9A is a perspective exploded view in partial section of a cassette and a vertical wall of a support frame therefore which forms an alternative form of the invention wherein film advance is governed by sensing film passage over a transport roller.
Figure 9B:
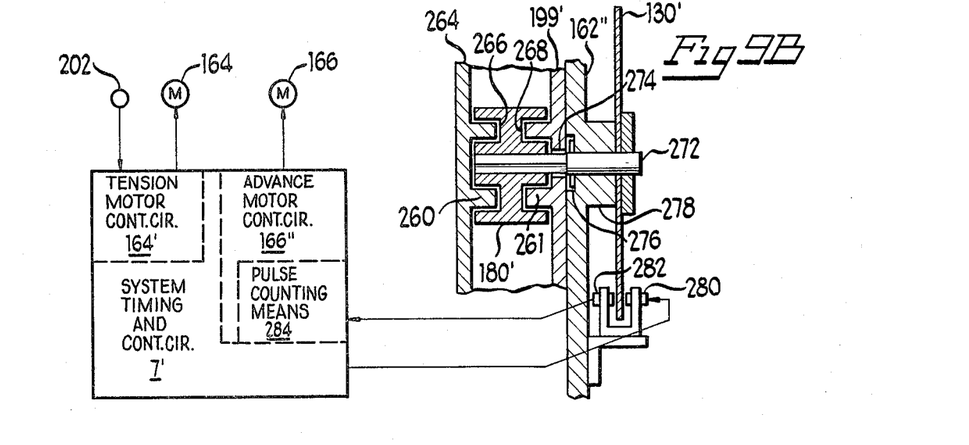
FIG. 9B is a partial cross-sectional view of the transport roller region of the cassette of FIG. 9A mounted on the support frame and engaging a film advance encoder wheel.

Alternately, if the use of unmarked film is envisioned, the film advance aperture and sensor system of FIG. 6 may be eliminated, and the film advance measured by a counting means driven by an idler roller 180' as shown in FIGS. 9A and 9B. The idler roller 180' is held loosely captive by circular ridges 260 and 261 extending from the walls 199' and 264 of the cassette 160' to engage two matching circular grooves 266 and 268 in the opposite faces of the idler roller 180'. A non-circular or otherwise keyed axial bore hole 270 in the idler roller 180' is provided to removably lockingly engage a correspondingly configured rotatable cantilever shaft 272 extending through the frame 162" and a hole 274 in the cassette wall 199' to lockingly engage the idler roller 180'. The shaft 272 is rotatably supported in place by a circular clip 276 and an external hub 278. Mounted on the hub is an encoder wheel 130' similar to that shown in FIG. 2. As the filmstrip 271 is advanced over the idler roller 180' the roller is rotated to rotate the shaft 272 and thereby rotate the encoder wheel 130'. The encoder wheel 130' in this embodiment is transparent with opaque sector markings 128'. Passage of the markings 128' past a phototransmission sensor of conventional design and consisting of a light source 280 and a photodetector 282 causes a series of pulses to be transmitted to a pulse counting means 284 in the advance motor control circuit 166". Film advance is terminated by conventional means upon attaining a preset value for the pulse count. Various alternative rotary counting or sensing means well known to the art may equally well be employed.

While for the purposes of illustration, various forms of this invention have been disclosed, other forms thereof may become apparent to those skilled in the art upon reference to this disclosure and, therefore, this invention shall be limited only by the scope of the appended claims. Thus, for example, the film advance motor 166 (FIG. 6) could be replaced by a releasable brake, with motive power for film advance provided by the tensioning spring 194.

I claim:

1. A cassette for dispensing photographic film comprising a housing, a light sealed dispensing portion in said housing, said dispensing portion comprising filmstrip supply support means, a takeup dispensing portion in said housing, said dispensing portion having filmstrip takeup support means, a strip of film extending between said supply and takeup support means and past an imaging area exposable to an external radiant energy source, said filmstrip having film position marking means thereon, and light access means in said housing to allow light detection of said film position marking means by an external sensing means.

2. The cassette as recited in claim 1 wherein said film position marking means is located adjacent spaced areas on said filmstrip representing separate frames to be imaged thereon, said light access means allowing detection of said film position marking means for a particular frame prior to the transport of said frame to said imaging area.

3. A cassette for dispensing photographic film comprising a housing; a light sealed dispensing portion in said housing, said dispensing portion comprising lockable filmstrip supply support means removably lockably engagable with a first external locking means not part of said cassette and guide means to guide a filmstrip from said filmstrip supply support means to an imaging area which area is exposable to an external imaging radiant energy source; a filmstrip takeup portion in said housing, said takeup portion comprising movable filmstrip tensioning means movably responsive to changes in tension in said filmstrip for receiving the film strip from said imaging area; and lockable film takeup means removably engagable with lockable external takeup drive means not part of said cassette; and a first portion in said housing exposable to an external first sensing means not part of said cassette which first sensing means senses the position of said tensioning means.

4. The cassette of claim 3 wherein said housing includes a second portion accessible to an external second sensing means not a part of said cassette which second sensing means senses the presence of film position marking means on said film.

5. The cassette as recited in claim 1, 3, or 4 wherein each of said portions of said housing exposable to an external sensing means is an opening therein for receiving the external sensing means.

6. The cassette as recited in claim 3 in which said tensioning means comprises a film guide roller rotatably affixed to a movable roller support, said support being compliantly mounted in said housing to apply a film tensioning force to said film.

7. The cassette as recited in claim 3 or 4 combined with a support therefor, and wherein said first sensing means which senses the position of said tensioning means comprises a reflection photosensor on said support, and said tensioning means includes a reflecting area thereon which is disposed opposite said first portion of said housing exposed to said reflection photosensor when a threshold tension is present in said film.

8. The cassette as recited in claim 1 or 4 wherein said film position marking means is detectable by optical sensing means, and said cassette is combined with a cassette support therefor, and said sensing means which senses said marking means includes a photodetector disposed on said support adjacent the associated exposed portion of said housing to sense the passage of said film position marking means.

9. The cassette as recited in claim 1 or 4 combined with said external sensing means which senses film position marking means, one of said external sensing means including an infrared source which is directed toward said film position marking on said film in said housing and a photodetector responsive to infrared illumination directed upon said marking means.

10. The cassette as recited in claim 3 wherein said lockable filmstrip supply support means comprises a reel configured to removably lockingly engage said first external locking means, said cassette being combined with said first external locking means and said external takeup drive means comprising a lockable rotary motor means, and said lockable film takeup means comprises a reel configured to removably lockingly engage with said lockable rotary motor means.

11. The combination recited in claim 9, wherein said first external locking means is a lockable drive motor which pays out the film from said supply reel when actuated from its locked condition.

12. An apparatus for dispensing photographic film comprising a filmstrip supply reel; a filmstrip takeup reel; guide means for guiding said film from said supply reel to an imaging area and from said imaging area to said takeup reel; a first lockable means lockingly engaged with said supply reel and operable between a normal locked condition where said supply reel is locked against rotation and an unlocked condition where said supply reel is rotated thereby or free to rotate to pay out the film; filmstrip tensioning means movably responsive to changes in tension in said filmstrip unwinding from said supply reel; a first sensing means for sensing the position of said tensioning means when a threshold filmstrip tension is achieved; a lockable motor means lockingly engaged with said takeup reel and operable between a normal locked condition where said takeup reel is locked against rotation and an unlocked drive condition where said takeup reel is driven to takeup the film strip dispensed from the supply reel; and control means for operating said first lockable means to said unlocked payout condition for a given predetermined period which reduces the tension in said filmstrip causing movement of said tensioning means, said control means operating said motor means to said driven condition until said first sensing means senses said position of said tensioning means where said threshold tension is achieved, said filmstrip supply reel, said filmstrip takeup reel, said guide means and said filmstrip tensioning means being included in a removable cassette, said cassette being removable from said motor means and said control means, said cassette further including a light sealed dispensing portion for containing unexposed film.

13. The microfiche film recording system of claim 12 wherein said first lockable means is a lockable drive motor which pays out the film from said supply reel when said lockable drive motor is actuated to said unlocked drive condition.

14. A microfiche film recording system comprising movable supporting means for supporting an intermediate filmstrip, said supporting means including means for receiving and guiding said filmstrip between filmstrip supply and takeup means, said filmstrip having a plurality of spaced selected areas thereon upon which individual images are to be sequentially formed, said film having marking means disposed thereon to denote said selected area, said marking means being disposed on a leading portion of said film only; film advancing means for advancing one of said selected areas of said filmstrip into an imaging position thereon; carriage means for moving said supporting means between an imaging station where said one of said selected area of said filmstrip is exposed and an image transfer station where said image on said one of said selected areas is transferred to a microfiche photographic film having frames upon which said image is to be transferred; means for controllably positioning said microfiche photographic film with respect to the selected imaged area on the intermediate filmstrip; means for transferring said image to a selected frame of said microfiche film by directing radiant energy through the selected area of said filmstrip onto said microfiche film; means for sensing the passage of said marking means during the operation of said film advancing means; timing means for marking a time interval wholly containing the period of operation of said advancing means responsive to the absence of sensing of said passage by said sensing means during said time interval for alerting an operator and preventing at least the transfer of an image from said filmstrip to said microfiche photographic film.

15. The microfiche film recording system as recited in claim 18, wherein said marking means comprise opaque markings and wherein said sensing means is a photosensor disposed to sense the passage of said opaque markings.

16. The microfiche film recording system of claim 14 or 19 in combination with a length of said intermediate filmstrip.

17. The microfiche film recording system as recited in claim 15, wherein said photosensor comprises a nonfilm fogging infrared light source and an infrared photodetector, said photosensor being disposed to sense the passage of said opaque markings before they reach said imaging position.

18. The cassette of claim 3 wherein said supply support means includes transport roller means removably lockingly engagable with external rotation sensing means not a part of said cassette, said transport roller means engaging said filmstrip to be rotated during film advance.

19. The cassette of claim 18 in combination with said rotation sensing means and control means, said rotation sensing means communicating rotation sensings of said transport roller means to said control means, said control means actuating said first external locking means to govern the degree of film advance in accordance with said rotation sensings.

20. The cassette system of claim 19 wherein said rotation sensing means generates a series of pulses whose number represents at any time during film advance a measure of the amount of film advanced, said control means including counting means for counting said pulses to govern said film advance.

21. The cassette system of claim 20 wherein said rotation sensing means includes a wheel coupled to be rotated by said transport roller means, spaced markers on said wheel, and pulse generating means for generating pulses in response to the passage of said markers thereby.

22. The cassette of claims 1, 2, 3, 4, 6 or 8 wherein said filmstrip supply support means or portions thereof and said filmstrip takeup means or portions thereof are preloaded and prethreaded with said filmstrip.

* * * * *

UNITED STATES PATENT AND TRADEMARK OFFICE
CERTIFICATE OF CORRECTION

PATENT NO. : 4,410,265
DATED : October 18, 1983
INVENTOR(S) : Herbert C. Ovshinsky It is certified that error appears in the above-identified patent and that said Letters Patent is hereby corrected as shown below:

```
        Column 3, line 23, delete "the" (second occurrence) and
insert --be--.
        Column 4, line 49, delete "and".
        Column 4, line 51, delete "." and insert --;--.
        Column 4, line 56, delete "." and insert --; and--.
        Column 9, line 57, delete "are" and insert --arm--.
        Column 10, line 42, delete "present" and insert
--preset--.
        Column 12, line 45, delete "film strip" and insert
--filmstrip--.
        Column 13, line 52, delete "film strip" and insert
--filmstrip--.
        Column 14, line 23, delete "on" and insert --of--.
        Column 14, line 37, delete "18" and insert --14--.
        Column 14, line 42, delete "19" and insert --15--.
        Column 14, line 44, delete "15" and insert --14--.
        Column 14, line 52, delete "engagable" and insert
--engageable--.
        Column 16, line 3, change "8" to --18--.
```

Signed and Sealed this

Second Day of April 1985

[SEAL]

Attest:

DONALD J. QUIGG

Attesting Officer    Acting Commissioner of Patents and Trademarks